(12) United States Patent
Jones et al.

(10) Patent No.: US 8,682,817 B1
(45) Date of Patent: Mar. 25, 2014

(54) PRODUCT TESTING PROCESS USING DIPLOID EVOLUTIONARY METHOD

(75) Inventors: Timothy B. Jones, Mount Vernon, IA (US); Joseph J. Engler, Coggon, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 262 days.

(21) Appl. No.: 13/224,648

(22) Filed: Sep. 2, 2011

(51) Int. Cl.
*G06N 3/12* (2006.01)

(52) U.S. Cl.
USPC .......................................................... 706/13

(58) Field of Classification Search
CPC ................................. G06N 3/12; G06N 3/126
USPC .......................................................... 706/13
See application file for complete search history.

(56) References Cited

U.S. PATENT DOCUMENTS

| | | | |
|---|---|---|---|
| 7,272,584 B2 * | 9/2007 | Diedrich et al. ................ | 706/13 |
| 2007/0112698 A1 * | 5/2007 | McArdle ......................... | 706/13 |
| 2008/0183648 A1 * | 7/2008 | Goldberg et al. ............... | 706/13 |
| 2009/0100293 A1 * | 4/2009 | LaComb et al. ................ | 714/26 |
| 2009/0327178 A1 * | 12/2009 | Jacobson ........................ | 706/13 |
| 2013/0102379 A1 * | 4/2013 | Sargent et al. .................. | 463/22 |
| 2013/0121548 A1 * | 5/2013 | Kovalan et al. ............... | 382/128 |

OTHER PUBLICATIONS

Engler, J., "Optimization of test engineering utilizing evolutionary computation," AUTOTESTCON, 2009 IEEE , vol., no., pp. 447-452, Sep. 14-17, 2009. doi: 10.1109/AUTEST.2009.5314025.*
Kominami, M. et al. "A New Genetic Algorithm with Diploid Chromosomes Using Probability Decoding for Adaptation to Various Environments". Electronics and Communications in Japan, vol. 93, Vo. 8, 2010. pp. 38-46.*
Engler, J. et al. "Agent-Based Control of Thermostatic Appliances," Green Technologies Conference, 2010 IEEE , vol., no., pp. 1,5, Apr. 15-16, 2010. doi: 10.1109/Green.2010.5453799.*
Wu, Y-G. et al. "A diploid genetic approach to short-term scheduling of hydro-thermal system", IEEE Transactions on Power Systems, vol. 15 , Issue 4, pp. 1268-1274. 2000. DOI: 10.1109/59.898100.*
Papadopoulos, Y. et al. "Engineering failure analysis and design optimisation with hip-hops." Engineering Failure Analysis, vol. 18, No. 2, pp. 590-608, Mar. 2011. http://dx.doi.org/10.1016/j.engfailanal.2010.09.025.*
Goldberg, D.E. et al. "Nonstationary function optimization using genetic algorithm with dominance and diploidy", Proceedings of the Second International Conference on Genetic Algorithms on Genetic algorithms and their application, 1987, pp. 59-68.*
Sheth, B. et al. "Evolving Agents for Personalized Information Filtering". IEEE, 1993. pp. 345-352.*

* cited by examiner

*Primary Examiner* — Jeffrey A Gaffin
*Assistant Examiner* — Benjamin Buss
(74) *Attorney, Agent, or Firm* — Donna P. Suchy; Daniel M. Barbieri

(57) ABSTRACT

Methods of analyzing solutions to a failure of a product are provided. A method comprises evaluating the fitness of solutions associated with a plurality of individuals in a population for the failure. Each of the plurality of individuals comprises a dominant genotype and a recessive genotype. Each genotype represents a solution for addressing a potential failure of the product. A fitness function is applied to the dominant genotype of each individual. The fitness function is configured to determine a confidence value for one or more of the solutions based on historical data regarding the solutions that is stored in a database. The method further comprises storing previously encountered genotypes in the recessive genotypes of the individuals and determining a proposed solution for addressing the failure of the product based on the fitness evaluation.

21 Claims, 5 Drawing Sheets

US 8,682,817 B1

PRODUCT TESTING PROCESS USING DIPLOID EVOLUTIONARY METHOD

CROSS-REFERENCE TO RELATED PATENT APPLICATIONS

The subject matter discussed in the present disclosure is related to copending U.S. patent application Ser. No. 13/051,835, titled "Explicit Diploid Evolutionary Algorithm," filed Mar. 18, 2011, which is hereby incorporated by reference in its entirety.

BACKGROUND

The present disclosure relates generally to the field of process control and/or optimization systems. More specifically, the present disclosure relates to systems for use in building and/or testing processes for the design and/or production of various products.

Optimization and modeling algorithms are used to optimize and model various environments. Some systems utilize biologically inspired algorithms (e.g., genetic algorithms, particle swarm intelligence, evolutionary strategies, etc.) to perform optimization and modeling due to their ability to properly learn and optimize variant environments rapidly. Genetic algorithms may be relatively slow and ineffective at handling environments which change during optimization. Such genetic algorithms may need to be restarted to effectively handle the changes upon detection of an environmental change, which may result in poor performance of the algorithm. Biologically inspired algorithms also are not equipped to maintain memory of previously encountered environments and must be restarted from scratch upon significant environmental change detection. This may result in poor performance and/or abandonment of the methodology for optimization and modeling.

One possible application of optimization and modeling methods is in the area of testing in product design and/or manufacturing processes. The testing of products throughout the manufacturing process results in a vast amount of data which is often analyzed in a post process model. Analysis of this data is typically limited to standard Six Sigma or statistical process control methodologies. This form of analysis is susceptible to overlooking correlations between differing test configurations as well as other non-intuitive relationships within the data itself. Often, this analysis is performed too late in the testing process to affect the most beneficial change. Post processing of test data requires that complete testing be performed even though failures may occur during the testing process.

SUMMARY

One embodiment of the disclosure relates to a method of analyzing solutions to a failure of a product. The method comprises evaluating the fitness of solutions associated with a plurality of individuals in a population for the failure. Each of the plurality of individuals comprises a dominant genotype and a recessive genotype. Each genotype represents a solution for addressing a potential failure of the product. A fitness function is applied to the dominant genotype of each individual. The fitness function is configured to determine a confidence value for one or more of the solutions based on historical data regarding the solutions that is stored in a database. The method further comprises storing previously encountered genotypes in the recessive genotypes of the individuals and determining a proposed solution for addressing the failure of the product based on the fitness evaluation.

Another embodiment of the disclosure relates to a control system comprising an electronic processor. The processor is configured to evaluate the fitness of solutions associated with a plurality of individuals in a population for the failure. Each of the plurality of individuals comprises a dominant genotype and a recessive genotype. Each genotype represents a solution for addressing a potential failure of the product. A fitness function is applied to the dominant genotype of each individual. The fitness function is configured to determine a confidence value for one or more of the solutions based on historical data regarding the solutions that is stored in a database. The processor is further configured to store previously encountered genotypes in the recessive genotypes of the individuals and determine a proposed solution for addressing the failure of the product based on the fitness evaluation.

Yet another embodiment of the present disclosure relates to a computer-readable medium having instructions stored thereon that are executable by a processor to execute a method of evaluating solutions to failures of a product during a testing process. The method comprises generating a population comprising a plurality of individuals. Each individual comprises a dominant genotype and a recessive genotype. Each genotype represents a solution for addressing a potential failure of the product. The method further comprises evaluating the fitness of the solutions associated with the plurality of individuals for a current failure by applying a fitness function to the dominant genotype of each individual. The fitness function is based on historical data regarding the solutions that is stored in a database. The historical data comprises at least one of success data or selection data. Success data indicates whether a respective solution that has been implemented in the past was associated with successfully addressing the failure or the failure remained. Selection data indicates whether a respective solution that was previously suggested to a user was selected by the user to be implemented or rejected by the user. The method further comprises storing previously encountered genotypes in the recessive genotypes of the individuals and determining a proposed solution for addressing the failure of the product based on the fitness evaluation.

DETAILED DESCRIPTION

Figure 1:
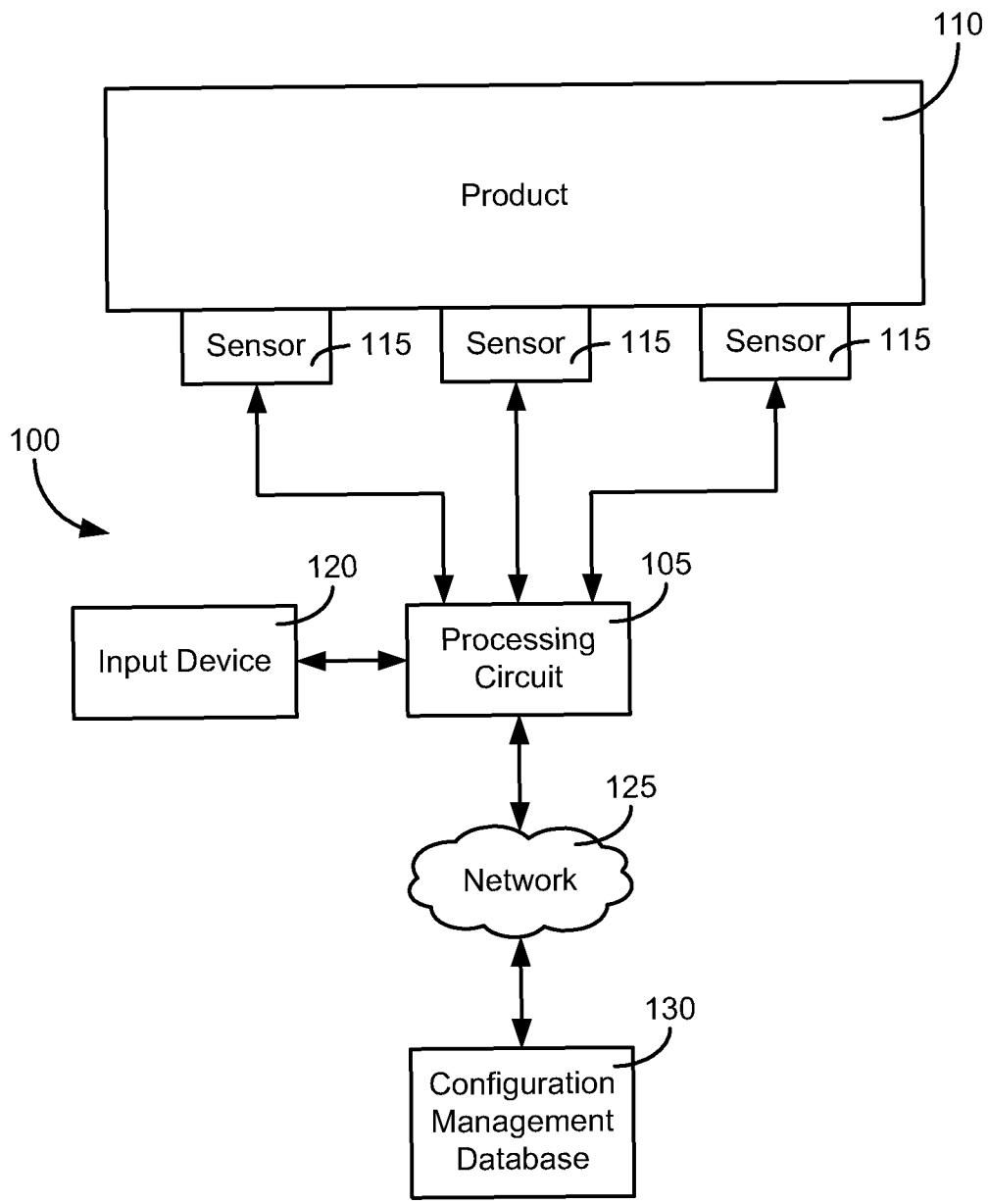
FIG. 1 is a block diagram of a testing system according to an exemplary embodiment.

Referring generally to the figures, systems, methods and algorithms for analyzing testing processes and proposing solutions to problems using diploid evolutionary methods are shown according to various exemplary embodiments. Genetic algorithms may be used to analyze a system operating environment and determine solutions that are most fit to allow the system to achieve certain goals. Genetic algorithms may evaluate a group of individuals in a population against a fitness function to determine which individuals are most fit to achieve the goals. Each of the individuals includes at least one genotype that represents a solution for controlling the system.

For example, in some embodiments, a genetic algorithm may be used to analyze possible solutions for problems that may arise in the building and/or testing phases of a product. In various embodiments, the product may be any type of good (e.g., an automobile, industrial machine, consumer product, software product, etc.), service (e.g., maintenance service, professional service, design service, etc.), or combination thereof. In some embodiments, input may be provided in the manner of manual input from a user of the system, such as a technician. For example, a technician may provide input regarding the problems being experienced in the testing phase through a user interface at a computing terminal, and the genetic algorithm may be configured to evaluate possible solutions to the problem based on the manual input from the user. In some embodiments, input may additionally or alternatively be provided by a machine involved in the testing and/or manufacturing process (e.g., automatically). For example, manual input from a user may be replaced by or supplemented with one or more data sets from sensors associated with the testing process configured to provide data relating to the problem experienced.

A population of individuals may be generated such that each individual represents one or more solutions for addressing a problem or combination of problems that may be experienced during the building and/or testing phase for the product. For example, each individual may include a genotype (e.g., a data structure, such as a bit string container) configured to store a solution for addressing one or more potential problems in the testing process (e.g., a bit string or other value representing descriptions of one or more actions that may be taken in response to the problem or a location in a memory storing descriptions of such actions). For example, a first value stored in a genotype of one individual may represent a proposed solution instructing that a particular bearing on a machine should be replaced. A second value stored in a genotype of another individual may represent another proposed solution instructing that a portion of the machine should be operated at a lower speed for some amount of time. The population of individuals may represent and/or contain all solutions that are to be examined in light of the fitness function.

The fitness function may be designed and/or customized for particular applications and/or to meet particular goals. In some embodiments, the fitness function may be designed to compare current failure conditions to previously encountered failure conditions and to determine whether or not the possible solutions (e.g., represented by the values stored in the population of individuals) were previously used successfully to address the same or similar types of failures. In some embodiments, the fitness function may utilize data (e.g., historical failure and/or solution records) obtained from a configuration management database or other type of data storage medium to evaluate the solutions represented by the values stored in the population of individuals. The fitness function may be configured to evaluate the solutions and generate a confidence level or value associated with the solutions. For example, if a first solution was successfully used to address the same or a similar problem in the past, and a second solution was also used to address the same or a similar problem but was unsuccessful, then the confidence level associated with the first solution may be higher than that associated with the second solution. In some embodiments, the confidence levels may be based on other factors than just success or failure of the solutions. For example, if a third solution was proposed by the algorithm as the best solution to the same or a similar problem but was not chosen by the user, the confidence level of the third solution may be reduced (e.g., because it may be assumed that the solution is a non-preferred solution, even if the algorithm indicates that it may potentially be the best fit to the problem). In some embodiments, confidence values associated with the solutions may be stored in a database, and the confidence values determined by the fitness function may be based in part on the previous confidence values associated with the solutions.

In some embodiments, a haploid genetic algorithm may be used to control a system. Haploid genetic algorithms, or genetic algorithms using a single genotype to represent each individual in the population of the algorithm, may react ineffectively to changes in environmental conditions.

Various exemplary embodiments disclosed herein utilize a diploid, vice haploid representation for individuals within the population of the algorithm where each individual is represented using a dominant genotype and a recessive genotype. Such embodiments may add explicit memory to biologically inspired algorithms with real-time change detection to speed optimization and modeling convergence. Diploid individuals are configured to store two separate solutions for the system, one in a dominant genotype and one in a recessive genotype. The solutions stored in the dominant genotypes may represent a main group of solutions to be evaluated for fitness in addressing the goals represented within the fitness function. The recessive genotype of each individual is used to maintain a memory or history of previous best individuals based on fitness evaluations for rapid environmental change detection and adjustment. For example, each individual in the population may include a dominant genotype configured to store a first value representing a potential solution (e.g., to a problem that may be encountered during a build and/or test phase of a product) and a recessive genotype configured to store a second value representing another solution. In various embodiments, the second value may represent a solution to the same or a similar problem as the first value or may represent a solution to a different type of problem. The second value may represent a solution that was previously evaluated using the fitness function and determined to be an appropriate, or fit, solution for a previously encountered problem (e.g., a set of conditions associated with a problem). A fitness function may be used to evaluate the fitness of individuals in the population for selection of parents for recombination and mutation and to arrive rapidly at a new optimization schema. Exemplary embodiments disclosed herein may provide memory of good solutions for previously encountered process environments, rapid convergence of control algorithms to changes in environments, and/or maintenance of diversity within the population of the algorithms.

Referring now to FIG. 1, a block diagram of a system 100 for analyzing solutions to problems encountered while manufacturing and/or testing a product 110 is shown according to an exemplary embodiment. Although embodiments are described below with respect to addressing problems in the context of a testing and/or manufacturing phase of a product, the present disclosure is relevant for any type of application where problems may arise and there is a desire to evaluate potential solutions to the problems. For example, various embodiments disclosed herein may be useful in maintenance applications (e.g., analyzing problems that occur while operating machines, systems, processes, etc.), software analysis applications (e.g., debugging software programs), decision analysis applications (e.g., analyzing defense or security-related decisions, business decisions, etc.), and/or any other type of application where previously encountered problems and solutions applied to those problems may be useful in addressing later problems.

As illustrated in the exemplary embodiment shown in FIG. 1, system 100 may be used to analyze potential solutions to problems encountered during a manufacturing and/or testing phase for a product 110. Product 110 may be any type of product, such as an aircraft or other vehicle, a consumer product (e.g., a portable communication or media device), a piece of industrial machinery (e.g., a machine used to produce consumer goods), or any other type of product. Various types of problems may arise during testing of a product, such as the product physically breaking down or failing to perform up to performance standards established during a design phase of the product. For the sake of discussion, consider an embodiment in which the product is an automobile. During a testing phase, an engineer or technician may uncover a variety of problems, such as mechanical failure of components (e.g., the frame, axels, bearings, etc.), overheating of the engine under certain operating conditions, unanticipated behavior of the transmission (e.g., for an automatic transmission, shifting gears at speed/RPM levels other than those anticipated under the design), failure to achieve certain performance marks that should be achievable under the design of the automobile (e.g., fuel economy, maximum speed or RPM, etc.), and/or other types of problems.

Processing circuit 105 may be configured to evaluate the problems experienced with product 110 and propose one or more solutions for addressing the problems. In some embodiments, processing circuit 105 may be configured to communicate with an input device 120 and collect information from a user (e.g., a technician or engineer) regarding the problems that are experienced. For example, processing circuit 105 and input device 120 may be associated with a computing terminal and input device 120 may include a display device for displaying information to the user and an input device (e.g., keyboard, mouse, touchscreen, audio input, etc.) for allowing a user to input information regarding the problems. In some embodiments, processing circuit 105 may be configured to provide a number of prompts (e.g., leading questions) to the user via input device 120 and receive answers to the prompts from input device 120. Processing circuit 105 may be configured to diagnose one or more potential problems and analyze possible solutions to the problem(s) based on the user input. In some embodiments, processing circuit 105 may additionally or alternatively be configured to use measurements from one or more sensors 115 and/or data from one or more computing and/or storage devices that are components of product 110 and/or the manufacturing and/or testing equipment for product 110. For example, in the context of an automobile product, processing circuit 105 may utilize data received from an RPM sensor, linear speed sensor, temperature sensor, fuel gauge, central processing unit, etc. of the automobile to diagnose problems and analyze potential solutions.

Processing circuit 105 may be configured to evaluate solutions to encountered problems using a diploid evolutionary method. For example, data relating to problems encountered during the production or testing of product 110 or similar products and/or data regarding potential solutions to the problems (e.g., solutions that were previously employed or not previously employed to address the problem, success or failure information of the solutions, whether the solutions were selected or rejected by previous users when presented with the solutions, etc.) may be collected and stored in a database 130 (e.g., a configuration management database). In some embodiments, database 130 may be used to store data from multiple manufacturing and/or testing systems and/or processes (e.g., aggregate the data). In some embodiments, processing circuit 105 may be configured to communicate with database 130 through a communication network 125 (e.g., a LAN, WAN, the Internet, etc.). The data may be used to generate and/or alter a fitness function that evaluates the fitness of possible solutions to determine an appropriate solution based on current environmental conditions (e.g., data regarding current conditions relating to the problem, such as data received from sensors and/or information provided by a user via input device 120). Good solutions encountered over time for addressing one or more types of problems may be stored and utilized in the event of recurrence of similar problems.

For example, while testing an automobile, an engineer may find that the engine is overheating under certain operating conditions. The engineer may provide a description of the problem to processing circuit 105 using input device 120 and/or processing circuit 105 may obtain data from one or more sensors 115 to diagnose that the problem is that the engine is overheating.

The fitness function may be designed to evaluate different possible solutions to the overheating problem (e.g., stored in a diploid population of individuals) based on historical data obtained from database 130. A first possible solution may be to replace a component in the radiator of the automobile. A second possible solution may be to adjust or replace a component in the engine itself. Data obtained from database 130 may indicate that, when an engine overheated in past tests under similar operating conditions, the first solution was suggested to a user and the user implemented the first solution to successfully address the problem. The data may indicate that the second solution was previously suggested to a user and the user implemented the second solution, but the second solution was not successful in overcoming the problem. In some embodiments, the fitness function may determine that the first solution, replacing a component in the radiator, has a higher confidence value for the problem being addressed than the second solution, replacing a component in the engine.

In another example, a third possible solution may be to revise part of the software operating on the processing unit of the automobile that controls how the engine operates under certain conditions (e.g., speed, RPM, temperature, etc.). The data may indicate that the third solution was previously suggested to a user but that the user rejected the third solution and instead used the first solution to address the problem. In some embodiments, the fitness function may assign the third solution a lower confidence value (e.g., lower than the first solution) because the third solution was not favored by the user and/or assign a higher confidence value to the first solution because it is favored by the user. In some embodiments, the confidence value assigned by the fitness function to the third solution may be further based on whether the first solution that was selected by the prior user was successful in addressing the problem.

Once a proposed solution has been determined, the solution may be used to address the problem with product 110. For example, the solution with the highest confidence level may be a value representing a location in a memory (e.g., database 130) containing a description of one or more steps or actions that may be taken to address the problem, or the solution stored in the individual itself may be the description of the steps or actions. A description of the proposed actions may be displayed to a user (e.g., via a display associated with input device 120 and/or processing circuit 105). The user may enact the actions to address the problem. In some embodiments, the user may choose to reject the proposed solution and/or request that a new proposed solution be presented. In some embodiments, processing circuit 105 may additionally or alternatively be configured to cause one or more actions to be taken based on the identified solution. For example, processing circuit 105 may be configured to send commands to a processing unit of product 110 (e.g., if product 110 is an automobile) changing one or more parameters used to control the operation of product 110 based on the identified solution.

Figure 2:
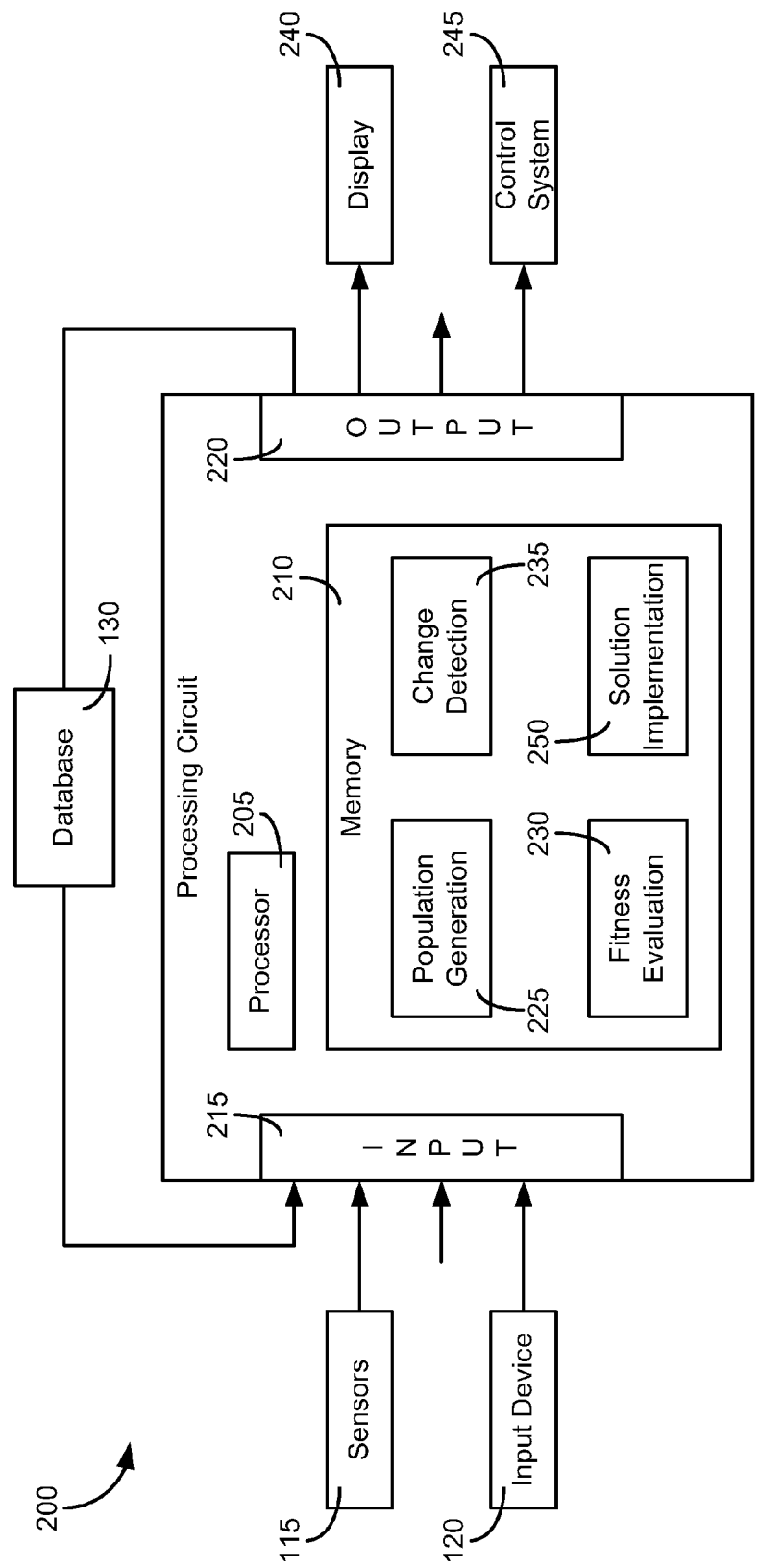
FIG. 2 is a block diagram of a processing circuit configured to evaluate solutions to failures using a diploid evolutionary method according to an exemplary embodiment.

Referring now to FIG. 2, a block diagram of a processing circuit 200 (e.g., an electronic processor) configured to analyze potential solutions to problems using a diploid evolutionary method is shown according to an exemplary embodiment. Processing circuit 200 includes at least one processor 205, which may be any general purpose or special purpose processor (e.g., FPGA, CPLD, ASIC, etc.). In some embodiments, processor 205 may be chosen based on the type of application with which processing circuit 200 is being utilized. Processing circuit 200 also includes a memory 210 that may be any type of computer or machine-readable media (e.g., hard drive, flash memory, ROM, RAM, EEPROM, CD, DVD, etc.).

Processing circuit 200 may also include an input interface 215 for receiving input data relating to the problems being analyzed and an output interface 220 for outputting signals relating to proposed solutions. Input interface 215 may be configured to receive data from one or more sensors 115 to be used in diagnosing the problem being experienced and evaluating possible solutions to the problem. The types of sensors that may be used may be dependent upon the application. For example, in an automobile product embodiment, sensors 115 may include a speed/RPM sensor, temperature sensor, pressure sensor, automobile processing unit, etc. In a consumer electronic product embodiment, sensors 115 may include a processing unit and/or sensors configured to measure voltage, current, capacitance, etc. Input interface 215 may additionally or alternatively be configured to receive input data from an input device 120 (e.g., keyboard, mouse, touchpad, audio input, etc.). For example, processing circuit 200 may be configured to diagnose problems and analyze potential solutions based in part on information provided (e.g., manually) by a user or technician using input device 120. Output interface 240 may be configured to provide information regarding one or more proposed solutions on a display 240 (e.g., incorporated as a part of input device 120 or a separate display device) and/or to cause one or more actions to be taken based on an identified solution by sending signals to a control system 245 (e.g., a processing unit of the product, a processing unit of testing equipment associated with the testing process, etc.). In some embodiments, input interface 215 and/or output interface 220 may be configured to communicate with a database 130 to retrieve and/or alter data stored in database 130 relating to potential problems that may be encountered and/or solutions to the problems.

Memory 210 may be configured to store one or more modules having instructions that are executable by processor 205. For example, memory 210 may include a population generation module 225 configured to generate a population of individuals for use in modeling an environment and evaluating solutions to various problems that may be encountered in a testing and/or manufacturing environment. The fitness of each individual within the context of the environment (e.g., based on conditions relating to the problem being addressed) may be evaluated by a fitness evaluation module 230, and the population may be modified or adjusted based on the fitness evaluation. Memory 210 may also include a change detection module 235 configured to detect a change in the environment of the system or process being controlled by processing circuit 200. Change detection module 235 may be configured to modify the population based on the detected environmental change. Memory 210 may also include a solution implementation module 250 configured to supply one or more identified solutions to a user (e.g., at display 240) and/or to implement one or more actions based on the identified solutions (e.g., via communication with control system 245).

Figures 3, 4:
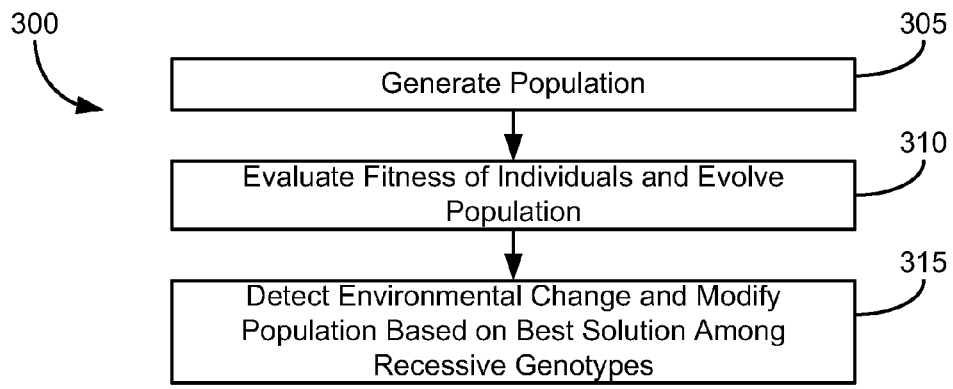
FIG. 3 is a flow diagram of a method of analyzing solutions to failures using a diploid evolutionary algorithm according to an exemplary embodiment.
FIG. 4 is a flow diagram of a method of generating a population of individuals for use in analyzing solutions to failures according to an exemplary embodiment.

Referring now to FIG. 3, a flow diagram of a method 300 for identifying solutions to one or more problems using a diploid evolutionary process is shown according to an exemplary embodiment. In some embodiments, method 300 may be implemented using a diploid evolutionary algorithm executed by a processing circuit (e.g., processing circuit 200).

At step 305, a population of individuals is generated (e.g., by population generation module 225) to model the environment of the process (e.g., the product testing and/or build process). Each individual may store one or more genotypes that may be values representing one or more solutions to problems that may be encountered during the process. For example, the values may represent locations in a memory (e.g., database 130) storing solutions to various problems (e.g., actions that may be taken to address the problems).

Evolutionary computation algorithms have been represented using a haploid representation in which each individual is represented by a single genotype. In the case of a genetic algorithm with binary bit string definitions, a haploid representation of each organism may be defined as follows:

$$ind_i = \{x_1, x_2, \ldots, x_n\} \text{ with } n \in R^2 \text{ and } x \in \{0,1\}$$

In this definition, $ind_i$ is the $i^{th}$ individual or organism in the population of the genetic algorithm. At each iteration of the genetic algorithm, the haploid genotype is evaluated against an optimization function and then subjected probabilistically to evolution via mutation and crossover. During the run of the evolutionary algorithm, the haploid representation may constantly be searching for the global optima of the search space.

In method 300, each individual in the population is represented using a diploid representation such that each individual has associated therewith both a dominant genotype and a recessive genotype. In some embodiments, the population may include solutions (e.g., values representing actions that may be taken) for addressing problems that may arise during the course of a build and/or test phase of developing a product, and each individual may be configured to store two solutions, one in the dominant genotype and one in the recessive genotype.

The dominant genotype of each individual may be used in diagnosing current problems and/or evaluating current proposed solutions, while the recessive genotype of each individual may be used to memorize solutions (e.g., good or successful solutions, solutions exhibiting a high confidence level, etc.) to previously encountered environments (e.g., previously encountered problems and/or related conditions). Each individual in the population of a genetic algorithm with binary bit string definitions may be defined as follows:

$$ind_i = \begin{cases} x = \{x_1, x_2, \ldots, x_n\} \\ y = \{y_1, y_2, \ldots, y_n\} \end{cases} \text{ where } x_j, y_j \in \{0, 1\}$$

The vector x represents the dominant genotype and the vector y represents the recessive genotype of individuals in the population.

Referring now to FIG. 4, a flow diagram of a method 400 including operations that may be performed as part of step 305 of method 300 is shown according to an exemplary embodiment. At step 405, a population of individuals having a diploid, or two genotype, representation is generated. The dominant genotype of each individual is populated with an initial genotype (step 410). In some embodiments, the dominant genotype may be randomly generated for each individual in the population. Utilizing randomly generated dominant genotypes may increase diversity of the achieved solution. The recessive genotype may be set to be empty, or null (step 415).

In some embodiments, the population of individuals (e.g., the dominant genotype) may be populated using information contained in lists or data sets regarding possible failures that may be experienced during a build and/or test phase for a targeted product and/or possible corrective actions for the product under test. Each genotype may store a value or link to one or more corrective actions that may be used to address one or more previously encountered or known failures or may store a description of the corrective actions themselves. The failures may be represented as or diagnosed using one or more test steps and one or more value ranges associated with each test step. Data relating to the failures and/or the associated corrective actions may be stored in a database (e.g., a configuration management database). In some embodiments, the database may be stored local to the build and/or test facility and/or may contain information collected at that specific facility. In some embodiments, the database may be stored remotely from the build and/or test facility and/or may contain information obtained from more sources than the test facility, such as other relevant prior test processes. In various embodiments, a generated population of individuals may include solutions specific to one particular type of failure or that are directed to a number of different types of failures. In some embodiments, the dominant genotypes of the population may be randomly generated by randomly selecting solutions (e.g., addressing one type of failure or multiple different types of failures, depending on the type of population desired) from the database.

In some embodiments, further individuals may be generated and inserted or injected into the population after the initial population has been generated (step 420). As with the individuals initially generated for the population, the additional individuals, or emigrants (e.g., random emigrants), may be assigned a randomly generated dominant genotype and an empty recessive genotype. Injecting new randomly defined individuals into the population may enhance the diversity of the population and/or promote exploration of the environment by the algorithm. One or more new individuals may be injected into the population at predefined times, periodically, based on specified conditions, randomly, etc. In some embodiments, the frequency with which new individuals are generated and/or the number of individuals generated may be based on a defined probability (e.g., a small user-defined probability).

Referring again to FIG. 3, at step 310, the fitness of each individual in the population for the environment being analyzed is evaluated. Fitness evaluation may be performed on the dominant genotype of each individual. Fitness evaluation may be performed based on a fitness or optimization function configured to identify the fitness of each individual for the problem being solved. In some embodiments, the output of the fitness function may be proportional (e.g., directly or inversely) to the fitness of the individual to which the fitness function is applied for the solution being sought (e.g., such that a higher fitness function output indicates a more fit individual for the solution).

In some embodiments, the fitness function may be configured to evaluate potential solutions based on previous outcomes of the same or similar solutions under the same or similar problem conditions and output a confidence value. The confidence value may represent an estimated likelihood of success for the respective solution in addressing the current problem based on previous experiences with the solution (e.g., whether the solution was used successfully or unsuccessfully in the past to address a similar problem, whether the solution was selected or rejected by a previous user to address a similar problem, etc.). The fitness function may be configured to determine a confidence value using on one or more formulas that are based upon previous results stored in a database (e.g., a configuration management database). For example, if a solution being evaluated by the fitness function was previously used successfully to solve the same or a similar problem, the fitness function may assign a relatively high first confidence value to the solution. If the solution was previously used unsuccessfully to address the same or a similar problem, the fitness function may assign a relatively low second confidence value to the solution. If the solution was previously suggested to a user but was not selected, the fitness function may be configured to assign a third confidence value to the solution that may be less than the first confidence value. In various embodiments, the solution being evaluated may have multiple prior records in the database (e.g., successful and/or unsuccessful, the same problem and/or slightly different problems, selected and/or rejected by previous users, etc.), and the fitness function may be configured to generate a confidence value based upon one or more of the prior records (e.g., average outcome, mean outcome, best outcome, worst outcome, eliminating one or more records from consideration based on predetermined criteria or parameters, etc.).

Parents may be selected for evolution based on the results of the fitness evaluation of each individual in the population. Once the parents have been selected, the population may be evolved by performing recombination and mutation on the selected parents until a new or updated population has been generated.

Figure 5:
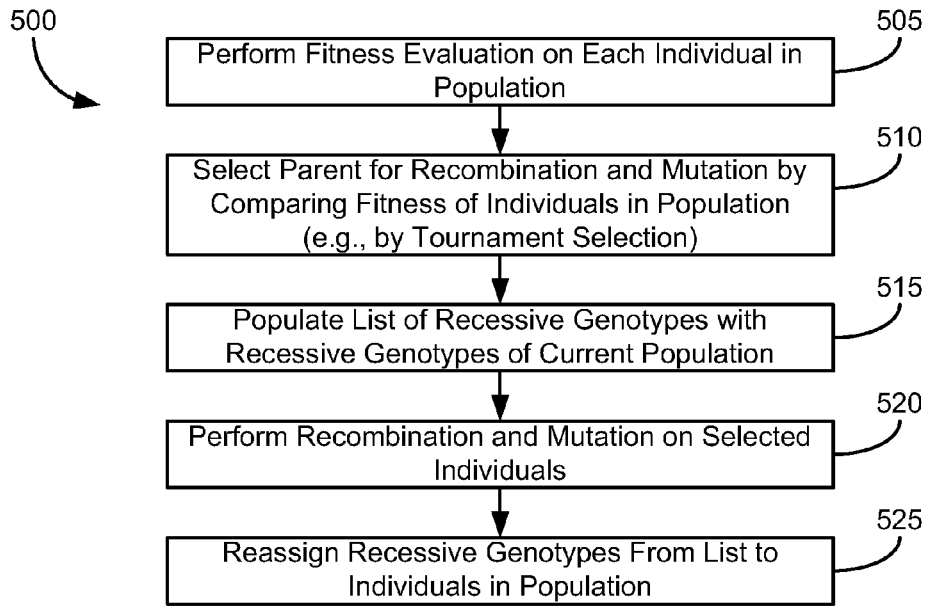
FIG. 5 is a flow diagram of a method of evaluating the fitness of a population of individuals and modifying the population based on the fitness evaluation according to an exemplary embodiment.

Referring now to FIG. 5, a flow diagram of a method 500 including operations that may be performed as part of step 310 of method 300 is shown according to an exemplary embodiment. At step 505, a fitness evaluation is performed on each individual in the population. The fitness evaluation may be performed by applying a fitness or optimization function to the dominant genotype of each individual.

Parents are then selected for recombination and mutation based on the results of the fitness evaluation of each of the individuals (step 510). In some embodiments, parents may be chosen through a tournament selection process. In the tournament selection process, individuals may be arranged in a tournament style such that adjacent pairs of individuals compete head-to-head, or are compared against each other for fitness. The individual with the greater fitness in each comparison proceeds to the next round to face another individual, and this process continues until a "winner" of the tournament, or best individual, is decided. The tournament algorithm may construct a tournament tree reflecting the tournament comparisons. The second-best individual must be among the direct losers to the best individual. These direct losing individuals may be determined by stepping through the first tournament tree and a second tournament may be held between the direct losing individuals to determine a second-best individual. The-third best individual must be among the direct losers of the second-best individual in either the first or second tournament trees, and another tournament may be held to determine the third-best individual. This process continues until the desired amount of parent individuals has been obtained. In some embodiments, each parent chosen for recombination and mutation of the n individuals in the population may be provided as follows:

$$selected_i = \text{argmax}_i f(i)$$

In the above, f(i) is the fitness of the $i^{th}$ individual in the population as measured against the fitness function. In some embodiments, two individuals will be selected for evolution of the population. In other embodiments, more than two (e.g., four, eight, etc.) will be chosen for recombination and mutation. In some embodiments, selection methods other than tournament selection may be used to select individuals from the population (e.g., roulette wheel, probabilistic weighting, etc.). In various embodiments, any selection methodology that accounts for the fitness of the individuals in relation to the fitness function may be used.

The recessive genotypes of the current population may be saved in a list of recessive genotypes (step 515) and recombination and mutation may be performed on the dominant genotype of the individuals of the population (step 520). Recombination may be performed by crossing over portions (e.g., bits for a bit string population) of the dominant genotype of the selected parents to generate new individuals for the evolved population. In some embodiments, a crossover rate may be provided (e.g., user-defined, predefined, random, etc.) upon which the crossover of parents may be based. The parents and/or new individuals may also be subjected to mutation by flipping (e.g., randomly) the allele of one or more loci of the dominant genotype. For binary bit string individuals, for example, mutation may involve randomly flipping the value of one or more bit string positions in the dominant genotype. The determination of which values to flip may be based upon a probability that is provided as a parameter. The recessive genotypes added to the recessive genotype list may be reassigned to individuals within the newly evolved population (step 525). In some embodiments, the recessive genotypes may be reassigned to individuals within the newly evolved population at random. Storing recessive genotypes at the time of performance of an evolutionary algorithm may be referred to as utilizing explicit memory.

Referring again to FIG. 3, environmental changes may be detected and the current population may be modified based on the best or most fit solution among the recessive genotypes in the population (step 315). A change in the environmental conditions may be detected by monitoring the best fitness of the population (e.g., the fitness of the most fit individual based on the evaluation of the dominant genotype of each individual against the fitness function) for changes. For example, the highest confidence value among the solutions in the dominant genotypes of the population may be monitored to determine if the highest confidence value drops below a threshold level, which may indicate that the problem being addressed has changed. When a substantial change, or a best fitness change above a particular threshold, is detected, the current best solution (e.g., the dominant genotype of the individual having the best fitness) may be saved within the recessive genotype of one of the individuals in the population and the best solution to the new changed environment may be determined from among the recessive genotypes of the current population. The population may be evolved based on the newly determined best saved solution.

By way of example, consider an electronic device product that is being subjected to a testing phase. A variety of different problems may be encountered when testing the electronic device. The solutions stored in the dominant genotype of the individuals in the population may be related to a hardware problem (e.g., if the user had previously attempted to address a hardware problem). For example, the dominant genotype solutions may represent solutions such as replacing a component (e.g., a resistor, capacitor, transistor, switch, etc.), making sure an electrical connection such as a plug and socket is tight, replacing or modifying a power source, etc. For certain hardware-related problems, the best confidence value of the solutions stored in the dominant genotypes of the population may be fairly high. If the user later attempts to solve a software-related problem, the best confidence value of the hardware-related solutions stored in the dominant genotypes of the population may drop significantly. This may indicate to the algorithm that a different type of problem is being addressed and that the population must be evolved in order to find a high-confidence solution to the problem.

Figure 6:
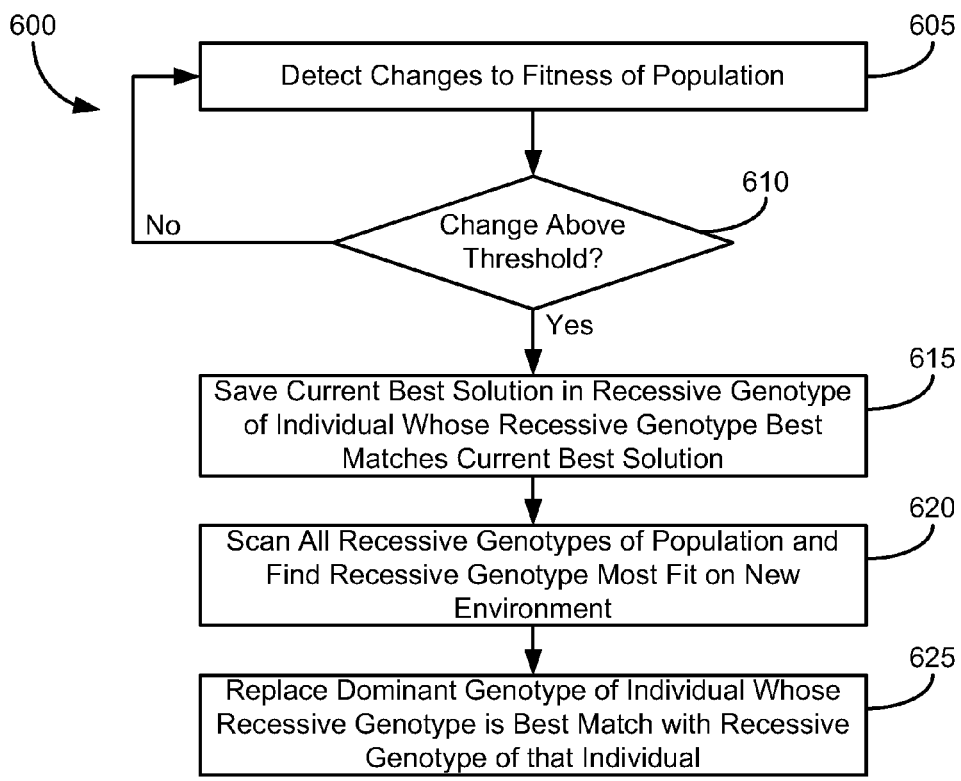
FIG. 6 is a flow diagram of a method of detecting and reacting to an environmental change of a monitored process according to an exemplary embodiment.

Referring now to FIG. 6, a flow diagram of a method 600 including operations that may be performed as part of step 315 of method 300 is shown according to an exemplary embodiment. At step 605, the fitness (e.g., confidence value) of the population is monitored (e.g., periodically, continually, after the occurrence of specified events or upon detection of particular input values, etc.) to detect any changes to the environment being monitored and/or controlled. A parameter or threshold c may be provided (e.g., user-supplied, predefined, etc.) and used to determine whether a decrease in the best fitness of the population signifies a significant environmental change such that a new best solution should be determined from a history or memory of previous solutions stored in the recessive genotypes of individuals in the current population. In some embodiments, a substantial change is detected as follows:

$$\text{change} = \begin{cases} \text{true if} & f(t) - f(t-1) > \varepsilon \\ \text{false} & \text{otherwise} \end{cases}$$

In the above, f(t) is the fitness of the best individual in the population at time t and f(t−1) is the fitness of the best individual in the population at a time prior to t. At step 610, it is determined whether a change above the threshold has been detected. If not, the best fitness of the population continues to be monitored (step 605).

The recessive genotypes of each of the individuals of the population operate to store a memory or history of previous environments. Specifically, the recessive genotypes are used to store previously encountered genotypes (e.g., dominant genotypes), such as dominant genotypes of best fit individuals from previous generations of the population.

If a change above the threshold has been detected, the current best solution, or dominant genotype of the individual in the current population having the best fitness, is saved in the recessive genotype of the individual of the population having a recessive genotype that most closely matches the current best solution (step 615). If the detected change is the first above-threshold change detected in the running of the diploid evolutionary algorithm, such that all recessive genotypes are set to empty or null, then all individuals in the population may have their recessive genotypes populated with the dominant genotype of the most fit individual in the previous generation (e.g., the most fit individual at time t−1). If the detected change is not the first change, the recessive genotypes of the current population may be scanned to find the recessive genotype that is most similar to the dominant genotype of the most fit individual in the previous generation.

In some embodiments, a metric similar to Hamming similarity may be used for the similarity determination, such as the following:

$$similarity_i = \sum_{j=0}^{N} \begin{cases} 1 & \text{if } ind_{ij} = best_j \\ 0 & \text{otherwise} \end{cases}$$

In the exemplary embodiment shown above, the comparison of the allele (e.g., value) of the $j^{th}$ loci (e.g., bit string position) of the individual under consideration is made to the allele of the $j^{th}$ loci of the best individual of the previous generation. Each of N loci in the individual under consideration are compared to the corresponding N loci of the best individual of the previous generation (i.e., a bit-wise comparison of the genotypes is performed). The similarity measure is determined based on the total number of similar bits found in the comparison. In other embodiments, other similarity measures may be utilized. Ties in similarity may be broken at random or based on parameters provided to the algorithm. Once the individual having the most similar recessive genotype is found, the recessive genotype is set to be the dominant genotype of the best fit individual of the previous generation.

At step 620, the recessive genotypes of each of the individuals in the current population are evaluated for fitness in current environmental conditions by applying the fitness function to the recessive genotypes. Once the recessive genotype of best fitness in the current environment is identified, the individual having the most fit recessive genotype has its dominant genotype replaced with its recessive genotype (step 625). In some embodiments, more than one most fit recessive genotype may be identified (e.g., the top 5, 10, 12, n, etc. most fit recessive genotypes) and the corresponding individuals may have their dominant genotypes replaced with the recessive genotypes. The replacement of dominant genotypes by the recessive genotypes assists in convergence if the current environment is similar to one that was previously encountered.

In some embodiments, mutation (e.g., at step 520 of method 500) may include a hypermutation in which an individual's dominant genotype may assume the value of its recessive genotype. The probability that an individual will undergo such a hypermutation may be provided as a parameter to the evolutionary algorithm. In some embodiments, the probability may be set to be relatively small, such that this form of hypermutation happens infrequently. This form of mutation may help increase the diversity of the current population as well as assist in possible anticipation of environmental changes.

Figure 7:
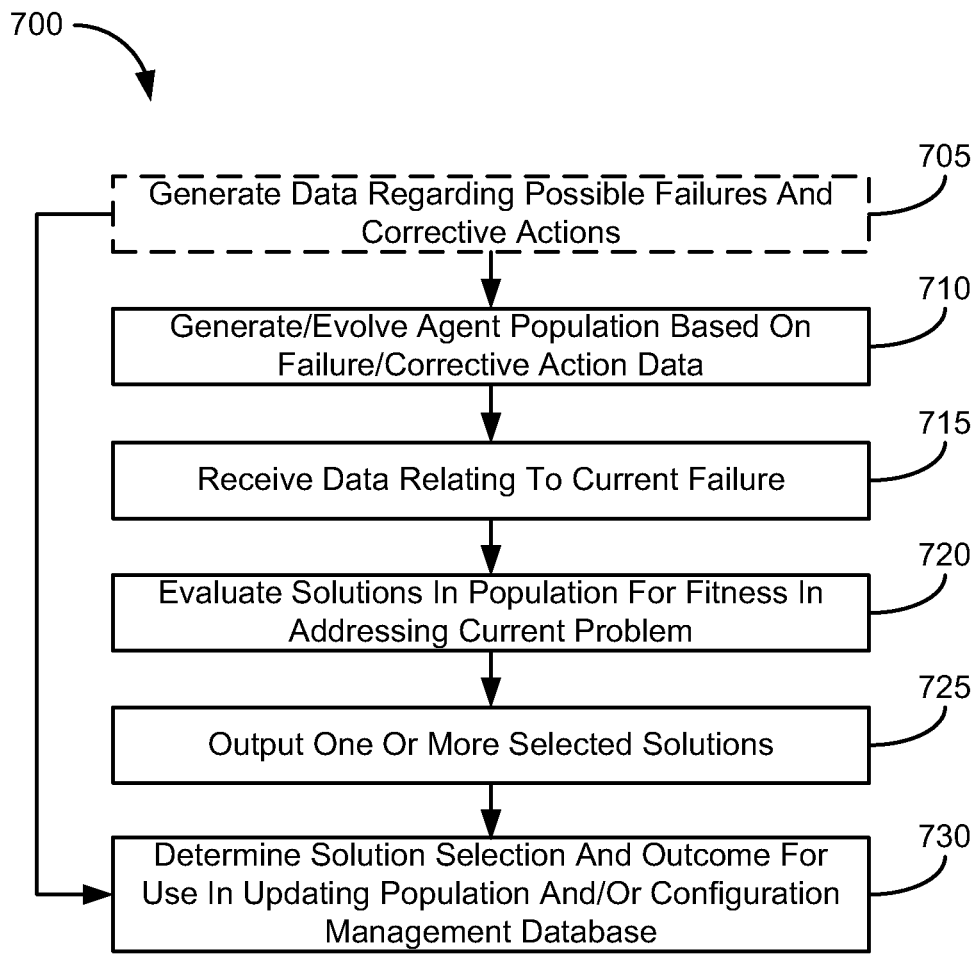
FIG. 7 is a flow diagram of a method of diagnosing failures and evaluating potential solutions according to an exemplary embodiment.

Referring now to FIG. 7, a flow diagram of a method 700 for diagnosing problems and evaluating potential solutions using a diploid evolutionary process is shown according to an exemplary embodiment. Method 700 may be used to analyze problems that may arise during a building and/or testing phase during development of a product. For example, method 700 could be used for diagnosis and guidance for the repair of faulty assemblies. A hosting system on which method 700 is implemented may utilize external resources, such as a configuration management database, to monitor the success of previously chosen repair strategies to determine repair strategies that should be suggested to address future problems. In various embodiments, method 700 may be implemented as a standalone algorithm configured to procure information about problems and evaluate potential solutions or a plug-in module to preexisting software (e.g., run on test stations and/or test data servers) configured to help address potential problems. In some embodiments, method 700 may be utilized in a run-time environment, constantly or repeatedly evolving as new test data is entered into the system and monitoring conditions to detect and diagnose problems and propose appropriate solutions immediately or within a short timeframe. In other embodiments, method 700 may be utilized on an on-demand basis, enabling users to determine when the application is updated and when solutions are evaluated.

At step 705, data regarding possible failures and potential corrective actions that may be used to address the failures may be generated. In some embodiments, the data may be stored as one or more established lists of possible failures for one or more products under test and the possible corrective actions that may be taken for the products. In some embodiments, the data may be specific to one particular product or one type or category of products. On other embodiments, the data may be a central database containing failure and corrective action information for several products. In some embodiments, the data may be stored in a database such as a configuration management database. The database may be stored local to the testing equipment (e.g., on a local hard disk of the testing system) or on a remote medium (e.g., server-based storage accessible via a computing network).

In some embodiments, the failure data stored in the database may include one or more test steps for use in diagnosing the type of failure. One or more of the test steps may have an associated value or range of values that may be used to determine whether the particular type of failure with which the test step is associated has been experienced. In an electronic device application, for example, a test process for a particular failure may include a step where the voltage across two points on a circuit board or two leads is to be measured. If the voltage is within the range of 11.00 volts to 13.00 volts, it may be determined that the failure with which the test process is associated is not the current failure. If the voltage is less than 11.00 volts, it may be determined that the failure with which the test process is associated is the current failure, or that it may be the current failure but further test steps need to be completed to conclude the determination. If, upon completion of the test steps, it is determined that the failure being tested is likely the current failure, the corrective action data associated with the relevant failure data in the database may be used to attempt to alleviate the failure.

At step 710, an agent population may be generated based on the failure and/or corrective action information stored in the database. For example, each individual agent in the population may be a diploid agent configured to store two potential solutions to failures that may occur during the testing process of a product (e.g., one in a dominant genotype, one in a recessive genotype). In some embodiments, the dominant genotype may be initially set to a randomly generated dominant genotype (e.g., a random solution selected from the database) and the recessive genotype may initially be set to be empty. In various embodiments, the generated agents may each store information ranging from a reference to one or more solutions or value ranges for tests that may be performed to diagnose the problem associated with the solutions to a full description of the entire test process. Each agent contains a single solution in each genotype that can be rated with a confidence value using a fitness function. For example, a first value stored in a genotype of one individual may represent a proposed solution instructing that a particular bearing on a machine should be replaced. A second value stored in a genotype of another individual may represent another proposed solution instructing that a portion of the machine should be operated at a lower speed for some amount of time. The population of individuals may represent and/or contain all solutions that are to be examined in light of the fitness function.

In some embodiments, a population may be generated to address multiple types of failures. In an automotive application, for example, a single population may be generated to address mechanical problems (e.g., problems with the frame, wheels, bearings, axels, engine, transmission, etc.), electrical problems (e.g., a short in the electrical system, failure in the battery or other power source, etc.), software problems (e.g., problems with the way in which the software in the processing unit is controlling various parts of the automobile), etc. In other embodiments, multiple populations may be generated, each of which contains solutions for addressing a single type of problem or a limited number of different types of problems (e.g., two, three, etc.). A more focused population (e.g., a population directed to an individual type of failure or a small number of failure types) may more quickly yield a higher-confidence solution set (e.g., the resulting agents' information after the evolution process has been utilized).

In some embodiments, one or more generated populations may be stored in databases (e.g., remotely) and accessed as requested by a user or host application. This may help facilitate both high rate production and low rate production. In some embodiments, multiple test stations may make use of the same populations. Such embodiments may provide for faster evolution and quicker generation of high-confidence solution approaches.

At step 715, upon failure of the unit or user invocation of failure analysis system, data relating to the current failure may be obtained for use in diagnosing the failure. In some embodiments, data may be collected prior to failure of the unit (e.g., continuously, periodically, etc.). In various embodiments, the data may be entered manually by a user (e.g., operator, technician, engineer, etc.) associated with the testing process and/or may be obtained by one or more sensors or processors associated with the testing process. For example, in some embodiments, data may be obtained by prompting a user to manually enter information into a testing terminal (e.g., having a user input device and a display). The testing terminal may be configured to prompt the user to enter certain desired information that may be useful in diagnosing the failure by displaying a series of questions and asking the user to provide responses to the questions. In some embodiments, potential responses may be provided to the user in the form of multiple choice answers or true/false answers. In other embodiments, the terminal may enable the user to enter text describing the failure, and the terminal may be configured to parse the text (e.g., using a keyword search) and correlate one or more terms in the text with saved data (e.g., data saved in a database, such as a configuration management database) to estimate a one or more likely failure types.

In some embodiments, data may be obtained directly from one or more processors or sensors associated with the testing equipment and/or the product being tested. For example, in an automotive application, the testing terminal may be configured to receive data from one or more sensors that are components of the automobile or are positioned in proximity to the automobile, such as temperature (e.g., engine temperature), pressure (e.g., oil pressure, tire pressure), RPM, and/or other types of sensors, and/or from a processing unit associated with the testing equipment or the automobile itself.

At step 720, the solutions stored in the population may be evaluated for their fitness in addressing the current problem. The solutions may be evaluated using a fitness function configured to calculate a confidence value (e.g., an estimate of the likelihood of success if the evaluated solution were used to address the current problem) based on prior failure and solution data (e.g., stored in a configuration management database). In some embodiments, the confidence value may be based at least in part on a number of times the solution was selected or rejected by a user and/or a number of times the solution was linked to or associated with eventual regaining of operation of the product or unit being tested.

In some embodiments, the fitness function may be designed to compare current failure conditions to previously encountered failure conditions and to determine whether or not the possible solutions (e.g., represented by the values stored in the population of individuals) were previously used successfully to address the same or similar types of failures. For example, if a first solution was successfully used to address the same or a similar problem in the past, and a second solution was also used to address the same or a similar problem but was unsuccessful, then the confidence level associated with the first solution may be higher than that associated with the second solution. In some embodiments, the confidence levels may be based on other factors than just success or failure of the solutions. For example, if a third solution was proposed by the algorithm as the best solution to the same or a similar problem but was not chosen by the user, the confidence level of the third solution may be reduced (e.g., because it may be assumed that the solution is a non-preferred solution, even if the algorithm indicates that it may potentially be the best fit to the problem).

In some embodiments, the fitness function may be configured to determine the confidence value based on the historical data regarding the solution being evaluated and/or similar solutions. For example, the fitness function may be configured to assign a particular value to each piece of historical data based on its outcome (e.g., whether or not it was chosen by a user, whether or not it eventually resulted in success or failure, etc.) and determine the confidence value for the solution being evaluated based on the values associated with the historical data (e.g., average, mean, weighted average, etc.). In some embodiments, confidence values associated with the solutions may be stored in a database, and the confidence values determined by the fitness function may be based in part on the previous confidence values associated with the solutions.

For example, while testing an automobile, an engineer may find that the engine is overheating under certain operating conditions. The fitness function may be designed to evaluate different possible solutions to the overheating problem (e.g., stored in a diploid population of individuals) based on historical data obtained from database 130. A first possible solution may be to replace a component in the radiator of the automobile. A second possible solution may be to adjust or replace a component in the engine itself. Data obtained from database 130 may indicate that, when an engine overheated in past tests under similar operating conditions, the first solution was suggested to a user and the user implemented the first solution to successfully address the problem. The data may indicate that the second solution was previously suggested to a user and the user implemented the second solution, but the second solution was not successful in overcoming the problem. In some embodiments, the fitness function may determine that the first solution, replacing a component in the radiator, has a higher confidence value for the problem being addressed than the second solution, replacing a component in the engine.

In another example, a third possible solution may be to revise part of the software operating on the processing unit of the automobile that controls how the engine operates under certain conditions (e.g., speed, RPM, temperature, etc.). The data may indicate that the third solution was previously suggested to a user but that the user rejected the third solution and instead used the first solution to address the problem. In some embodiments, the fitness function may assign the third solution a lower confidence value (e.g., lower than the first solution) because the third solution was not favored by the user and/or assign a higher confidence value to the first solution because it is favored by the user. In some embodiments, the confidence value assigned by the fitness function to the third solution may be further based on whether the first solution that was selected by the prior user was successful in addressing the problem.

At step 725, one or more identified solutions (e.g., the solution(s) with the highest confidence value(s)) may be output by the fitness function and used to address the failure. In some embodiments, an identified solution may be provided to a user of a testing terminal via a display device. In some embodiments, the user may be able to accept or reject the proposed solution. In the event the user rejects the proposed solution, one or more alternative solutions may be presented to the user (e.g., the solution(s) having the next-highest confidence values). In some embodiments, the user may initially be presented with multiple possible solutions.

In some embodiments, corrective actions may be implemented in an automated fashion based on the proposed solutions. For example, if the proposed solution indicates that one or more parameters in the controller of a product should be changed and the testing terminal is in communication with the controller of the product, the testing terminal may be configured to transmit signals to the controller to cause the controller to change the parameters. In this way, the testing terminal may be configured to alter the parameters until the failure has been corrected with or without further input from the user.

At step 730, the agent population may be evolved based on the selected solution and/or the outcome of implementing the solution. Data regarding the selected solution and/or the outcome (e.g., successful or unsuccessful) may be received, for example, from a user via a user input device at a testing terminal. In some embodiments (e.g., if the solution was unsuccessful or was not selected), the solution may be saved in the database as an additional data point for use in calculating a confidence value to the solution in future solution evaluations but may not be used in evolving the population. In some embodiments, (e.g., if the solution was selected and was successful), the solution may be saved in the database and may also be used to evolve the agent population (e.g., one or more dominant genotype values may be evolved, such as by mutation and/or recombination, based on the successful solution). As the population continues to be evaluated for successful solution approaches, the population will evolve to provide better solutions. Also, because the population maintains a memory of prior success states, anomalous failures will not eliminate correct solutions from the population, which may allow flexibility for handling both short-term failure sets as well as long-term failure sets.

Process 700 may be repeated each time a failure is encountered or each time a user submits a request. In some embodiments, it may be determined (e.g., using a process such as process 600) that the solutions stored in the dominant genotypes do not include solutions that yield sufficiently high confidence values for a particular problem. For example, the highest confidence value of the population (e.g., stored in the dominant genotypes) may drop twenty percent from the highest confidence value of the population for a previously addressed problem. This may indicate that the solutions stored in the dominant genotypes of the population may not be well-suited to address the current failure and that the solution may need to be evolved to find a more suitable solution.

As explained above, the recessive genotypes of the individuals may be used to store previously evaluated good solutions (e.g., high confidence value solutions) to previously encountered problems. When a substantial change in the best confidence value of the population is encountered, the current best solution may be saved in the recessive genotype of the agent whose recessive genotype most closely matches the current best solution (see, e.g., step 615 of process 600), the recessive genotypes of the population may be scanned to determine the most fit recessive genotype for the current failure (see, e.g., step 620 of process 600), and the dominant genotype of the individual whose recessive genotype is the best match with the identified recessive genotype may be replaced with the identified recessive genotype (see, e.g., step 625 of process 600). The dominant genotypes of the population may then be evolved to find more fit solutions to the current problem.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of analyzing solutions to a failure of a product, comprising:
    receiving input data relating to one or more current problems with the product occurring during development of the product;
    evaluating a fitness of solutions associated with a plurality of individuals in a population for the failure to generate a fitness evaluation, each of the plurality of individuals comprising a dominant genotype and a recessive genotype, wherein each genotype represents a solution for addressing a potential failure of the product, wherein a fitness function is applied to the dominant genotype of each individual, wherein the fitness function is configured to determine a confidence value for one or more of the solutions based on the input data relating to the one or more current problems with the product and historical data regarding the solutions stored in a database, wherein the historical data regarding the solutions is representative of at least one of whether the solutions were previously selected or rejected by a user and whether the solutions were successful or unsuccessful in addressing one or more previous problems, and wherein the confidence value for a solution represents an estimated likelihood of the solution successfully addressing the one or more current problems with the product;
    storing previously encountered genotypes in the recessive genotypes of the individuals; and
    determining a proposed solution for addressing the failure of the product based on the fitness evaluation.

2. The method of claim 1, further comprising detecting a change in a type of failure being addressed by comparing a best confidence value of a current generation of the population with a best confidence value of a previous generation of the population.

3. The method of claim 2, wherein detecting a change in a type of failure being addressed comprises detecting a decrease in the best confidence value of the population that exceeds a threshold.

4. The method of claim 2, further comprising:
    saving the dominant genotype of an individual having the best confidence value of the current generation in a recessive genotype;
    determining a recessive genotype that is most fit to a current failure under the fitness function; and
    replacing a dominant genotype with the recessive genotype that is determined to be most fit to the current failure.

5. The method of claim 1, wherein the historical data regarding the solutions comprises at least one of success data or selection data, wherein success data indicates whether a respective solution that has been implemented in the past was associated with successfully addressing the failure or the failure remained, and wherein selection data indicates whether a respective solution that was previously suggested to a user was selected by the user to be implemented or rejected by the user.

6. The method of claim 5, further comprising:
determining an outcome associated with the proposed solution, wherein the outcome comprises at least one of success data or selection data; and
modifying at least one of the individuals in the population based on the outcome.

7. The method of claim 1, further comprising generating a plurality of populations of individuals, wherein each population is configured to contain solutions directed to a different type of problem.

8. The method of claim 1, wherein receiving the input data comprises receiving one or more failure parameters from a user via a user input device, wherein the fitness of the solutions associated with the plurality of individuals in the population for the failure is evaluated based on the failure parameters, and wherein the method further comprises transmitting the proposed solution to a display.

9. A control system, comprising:
an electronic processor configured to
receive input data relating to one or more current problems with the product occurring during development of the product;
evaluate a fitness of solutions associated with a plurality of individuals in a population for the failure to generate a fitness evaluation, each of the plurality of individuals comprising a dominant genotype and a recessive genotype, wherein each genotype represents a solution for addressing a potential failure of the product, wherein a fitness function is applied to the dominant genotype of each individual, wherein the fitness function is configured to determine a confidence value for one or more of the solutions based on the input data relating to the one or more current problems with the product and historical data regarding the solutions stored in a database, wherein the historical data regarding the solutions is representative of at least one of whether the solutions were previously selected or rejected by a user and whether the solutions were successful or unsuccessful in addressing one or more previous problems, and wherein the confidence value for a solution represents an estimated likelihood of the solution successfully addressing the one or more current problems with the product;
store previously encountered genotypes in the recessive genotypes of the individuals; and
determine a proposed solution for addressing the failure of the product based on the fitness evaluation.

10. The control system of claim 9, wherein the processor is configured to detect a change in a type of failure being addressed by comparing a best confidence value of a current generation of the population with a best confidence value of a previous generation of the population.

11. The control system of claim 10, wherein the processor is configured to detect the change in the type of failure being addressed by detecting a decrease in the best confidence value of the population that exceeds a threshold.

12. The control system of claim 10, wherein the processor is configured to save the dominant genotype of an individual having the best confidence value of the current generation in a recessive genotype, determine a recessive genotype that is most fit to a current failure under the fitness function, and replace a dominant genotype with the recessive genotype that is determined to be most fit to the current failure.

13. The control system of claim 9, wherein the historical data regarding the solutions comprises at least one of success data or selection data, wherein success data indicates whether a respective solution that has been implemented in the past was associated with successfully addressing the failure or the failure remained, and wherein selection data indicates whether a respective solution that was previously suggested to a user was selected by the user to be implemented or rejected by the user.

14. The control system of claim 13, wherein the processor is configured to select the one or more selected individuals using a tournament selection based on results of the application of the fitness function to the dominant genotypes of the individuals.

15. The control system of claim 9, wherein the processor is configured to determine an outcome associated with the proposed solution, wherein the outcome comprises at least one of success data or selection data, and wherein the processor is further configured to modify at least one of the individuals in the population based on the outcome.

16. The control system of claim 9, wherein the processor is configured to generate a plurality of populations of individuals, wherein each population is configured to contain solutions directed to a different type of problem.

17. The control system of claim 9, wherein the input data comprises one or more failure parameters received from a user via a user input device, and wherein the processor is configured to evaluate the fitness of the solutions based on the failure parameters.

18. A non-transitory computer-readable medium having instructions stored thereon, the instructions being executable by a processor to execute a method of evaluating solutions to failures of a product during a testing process, the method comprising:
receiving input data relating to one or more current problems with the product occurring during the testing process;
generating a population comprising a plurality of individuals, each individual comprising a dominant genotype and a recessive genotype, wherein each genotype represents a solution for addressing a potential failure of the product;
evaluating a fitness of the solutions associated with the plurality of individuals for a current failure to generate a fitness evaluation by applying a fitness function to the dominant genotype of each individual, wherein the fitness function is based on the input data relating to the one or more current problems with the product and historical data regarding the solutions stored in a database, wherein the historical data comprises at least one of success data or selection data, wherein success data indicates whether a respective solution implemented in the past was associated with successfully addressing the failure or the failure remained, wherein selection data indicates whether a respective solution previously suggested to a user was selected by the user to be implemented or rejected by the user, and wherein the confidence value for a solution represents an estimated likelihood of the solution successfully addressing the one or more current problems with the product;
storing previously encountered genotypes in the recessive genotypes of the individuals; and
determining a proposed solution for addressing the failure of the product based on the fitness evaluation.

19. The non-transitory computer-readable medium of claim 18, wherein the method further comprises detecting a change in a type of failure being addressed by:
comparing a best confidence value of a current generation of the population with a best confidence value of a previous generation of the population; and determining that a decrease in the best confidence value of the population exceeds a threshold.

20. The non-transitory computer-readable medium of claim 18, wherein the method further comprises:
   determining an outcome associated with the proposed solution, wherein the outcome comprises at least one of success data or selection data; and
   modifying at least one of the individuals in the population based on the outcome.

21. The non-transitory computer-readable medium of claim 18, wherein receiving the input data comprises receiving one or more failure parameters from a user via a user input device, wherein the fitness of the solutions associated with the plurality of individuals in the population for the failure is evaluated based on the failure parameters, and wherein the method further comprises transmitting the proposed solution to a display.

* * * * *